June 7, 1960 L. SHAPIRO 2,939,908

COLOR CORRECTION SYSTEM

Filed July 20, 1956 4 Sheets-Sheet 1

INVENTOR.
Louis Shapiro
BY Morris A. Rabkin
ATTORNEY.

June 7, 1960 L. SHAPIRO 2,939,908

COLOR CORRECTION SYSTEM

Filed July 20, 1956

4 Sheets-Sheet 2

INVENTOR.
Louis Shapiro

BY Morris L. Rabkin

ATTORNEY.

INVENTOR.
Louis Shapiro
BY Morris A. Rabkin
ATTORNEY.

June 7, 1960 L. SHAPIRO 2,939,908
COLOR CORRECTION SYSTEM
Filed July 20, 1956 4 Sheets-Sheet 4

INVENTOR.
Louis Shapiro
BY Morris A. Rabkin
ATTORNEY.

United States Patent Office 2,939,908

Patented June 7, 1960

2,939,908

COLOR CORRECTION SYSTEM

Louis Shapiro, Haddonfield, N.J., assignor to Radio Corporation of America, a corporation of Delaware Filed July 20, 1956, Ser. No. 599,255

23 Claims. (Cl. 178—5.2)

This invention relates to color-correction systems for color-reproduction processes, and more particularly to a system for obtaining a black plate for use in four-color reproduction.

In a three-color system of reproducing a colored original by means of printing plates, the blacks and grays of the original are reproduced by super-imposing all three colored inks. While it is theoretically possible to produce any color, within certain limits, by combining, in proper proportions, inks of the three subtractive primary colors, cyan, magenta, and yellow, the use of black in addition to the three primaries has a number of advantages. Due to deficiencies in the inks, a very dark black cannot generally be produced by an overlay of the three ink primaries. In four-color printing, the use of black ink in addition to the primaries provides a greater brightness range. Other advantages of the four-color system are the saving of relatively expensive colored inks and sharper outlines and details in the printed reproduction. Accordingly, four-color reproductions are generally preferred.

In a four-color system of color-correction, the colored original is scanned with a beam of light to produce three sets of electrical signals representative of the additive color primaries, red, green, and blue. From these signals, four sets of corrected electrical signals are computed representative of the subtractive primaries and black. The corrected signals are used to control the intensity of a light source to expose four color-corrected negatives or "printers," which are used to make the printing plates.

In the past, it was proposed to print black ink where all three of the colored inks would be superimposed in the three-color system. To compensate for the addition of black ink, the under-color that produced black was removed. A dot of black ink replaced the area of the smallest color dot, and the sizes of the other color dots were correspondingly reduced by the size of the black dot. One such proposed system is described in the patent to Hall, U.S. No. 2,231,668. This type of system for preparing the color-corrected negatives has not given optimum results. As explained in the patent to Hardy, et al., U.S. No. 2,431,561, the accurate computation of the black and subtractive primary dot sizes requires consideration of much more complex relationships among the dot sizes than the simplified theory implies. This Hardy patent discloses a system for computing the ink dot sizes that takes into account these complex relationships.

In the preparation of a black printer, it is not only desirable that theoretical requirements are met, but also that the practical requirements and preferences of the photoengraving and graphic arts are met. It has been found, for example, that it is preferred that black not be printed, or printed only in small amounts, in certain instances even though all three of the subtractive primaries are present. Furthermore, these preferences are not uniform. It is apparent, therefore, that a system for preparing a black printer that can be readily adapted to carry out the varied requirements and preferences of the graphic arts is needed.

In a patent application "Color Correction Systems" of H. J. Woll, Serial No. 371,371, filed July 30, 1953, issued as Patent No. 2,848,528 on August 19, 1958, and assigned to the same assignee as that of this application, another black printer system is described. In a system described in this copending application, a brightness signal is derived that is related to the brightness of the image area to be reproduced. Another signal is derived that is related to the color saturation condition of the image area to be reproduced. A black signal is generated in accordance with both the brightness and the saturation signals.

In a color correction computer of the type described in the aforementioned Hardy patent, the computer tends to operate as though an overlay of the three colored inks (for example, certain proportions of cyan, magenta, and yellow) is the same as black ink. However, for many purposes the three color overlay is not the same as black ink; and often the eye may note the difference in a printed reproduction. As a result, for certain printed copy, it is desirable that sharp transitions from black ink to a three color overlay representing black be avoided in adjacent areas of a printed reproduction. It has been found that the etching action of the photoengraving process tends to be non-linear at sharp edges of the photoengraving plate. This etching action tends to accentuate any sharp transitions of the image represented by these sharp edges in the three color and black plates. As a result of this etching action, any sharp transitions between black ink and a three color overlay for black tend to become more pronounced. It has also been found that the changes in black ink in image areas calling for gradual transitions should be not greater than a certain number of times the rate of change of that colored ink that is changing most rapidly. If this relationship is not maintained, excessive black ink tends to be printed at certain areas and spurious detail in these areas results. In addition to the foregoing objections to sharp edges in a black plate, certain portions of the printing industry have marked preferences for a black plate that has gradual or controlled transitions and avoids sharp edges (except, of course, when an image to be reproduced contains such sharp transitions).

Accordingly, it is among the objects of this invention to provide:

A new and improved system for producing a black printer;

A new and improved system for producing four color corrected records corresponding to three primary colors and black;

A new and improved color correction system that may be readily adapted to meet varied preferences and requirements in the amount of black to be printed.

In accordance with this invention a brightness signal is produced in accordance with the brightness of the area to be reproduced. A saturation signal is produced in accordance with the extent to which all three of the component colors to be reproduced are present. These brightness and saturation signals are continuously combined over an extended range of both signals; the black-printer signal is derived from the combined signal.

For purposes of combining the saturation and brightness signals it has been found desirable to mix these signals on a non-linear basis; that is to say, to provide an output signal which is a non-linear function of the two input signals (the aforementioned brightness and saturation signals).

Accordingly, it is also among the objects of this invention to provide:

A new and improved non-linear mixing circuit;

A new and improved circuit for generating a non-linear function of two or more variable inputs.

In accordance with this invention a non-linear mixer circuit is provided by using a plurality of electron control devices, each of which has a remote cutoff characteristic. The input signals to be mixed are applied to the control electrodes of different ones of these devices. The cathode electrodes of these devices are connected to a common impedance. An output signal is derived at this impedance. This output signal is proportional to the sum of non-linear functions of the input signals. These non-linear functions are related to the non-linear characteristics of the respective control devices and, also, to the relative values of the input signals.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
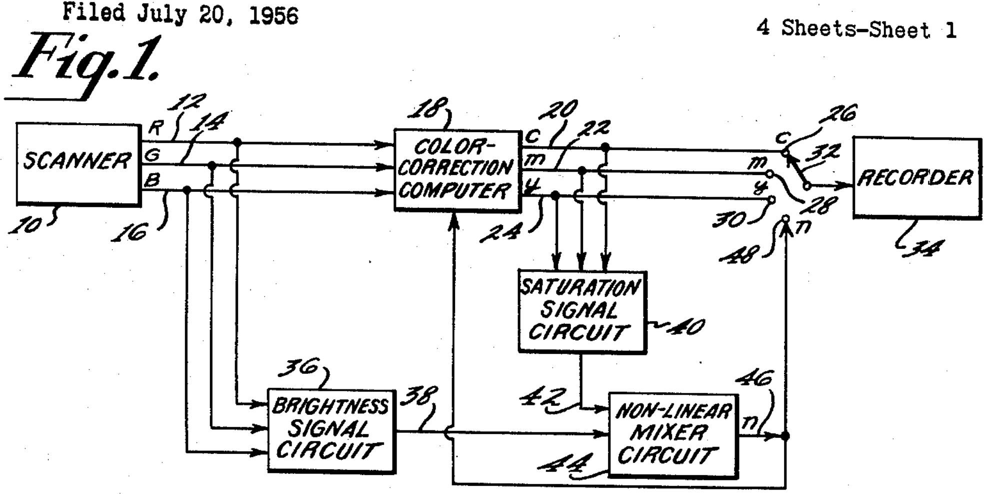
Figure 1 is a schematic block diagram of a color correction system embodying this invention.

In Figure 1, a color-correction system embodying this invention is shown. A subject (not shown) having color characteristics is scanned by means of a scanner system 10 to provide electrical signals on three channels 12, 14, and 16 corresponding to color component characteristics of this subject. The signals on the channels 12, 14, and 16 may correspond, for example, to certain additive primary colors, for example, those commonly known as red (R), green (G), and blue (B), respectively. The spectral characteristics of these primary colors are determined by the choice of color filters (not shown) used with the scanner system 10. An appropriate form of a flying spot scanner system that may be used for this purpose is described in U.S. Patent No. 2,740,828. The R, G, B signals in the channels 12, 14, and 16 are applied to a color-correction computer which may be of the type described in the aforementioned Hardy patent U.S. 2,431,561. The outputs of this computer 18 are electrical signals in the channels 20, 22, and 24. These electrical signals correspond to values of the colored inks that may be used to provide a printed reproduction of the original colored subject. Commonly used colored inks for such printed reproductions are cyan (*c*), magenta (*m*), and yellow (*y*).

The computer output channels 20, 22, and 24 are connected to selector switch terminals 26, 28, and 30, respectively. The movable contact 32 of the selector switch connects one of these terminals 26, 28, 30 to a recorder 34, which may be operated synchronously with the scanner 10 to produce color corrected photographic separations of the original subject. An appropriate form of recorder is described in patent U.S. No. 2,740,828, noted above. These corrected photographic separations may be used to make the photoengravings used to print the reproduction.

The R, G, B signals in the channels 12, 14, and 16 are also applied to a brightness signal circuit 36. This circuit 36 produces in its output channel 38 a signal that is related to the brightness or luminance of the original subject being scanned; the brightness or luminance of an image is greatest in light areas, and least in dark areas. This brightness signal is derived from a combination of all three of the R, G, B signals, an appropriate combination is described hereinafter.

The ink signals *c*, *m*, and *y* in the computer output channels 20, 22, and 24 are also applied to a saturation signal circuit 40. This saturation signal circuit 40 derives from the ink signals *c*, *m*, and *y*, a signal that is related to the color saturation or purity of the image area to be reproduced; a color has a low level of saturation or purity when it is made up of substantial amounts of all three inks, and a high level of saturation when at least one of the inks is absent or substantially absent. This saturation signal is supplied by way of the channel 42 to a non-linear mixer circuit 44. The mixer circuit 44 also receives the brightness signal in the channel 38. The mixer circuit combines the saturation and brightness signals in accordance with certain relationships of the brightness and saturation signals to produce a black signal as an output signal. This black (*n*) signal on the channel 46 is fed back as an input to the color-correction computer 18, and is also fed as an output to the selector switch terminal 48.

Figure 2:
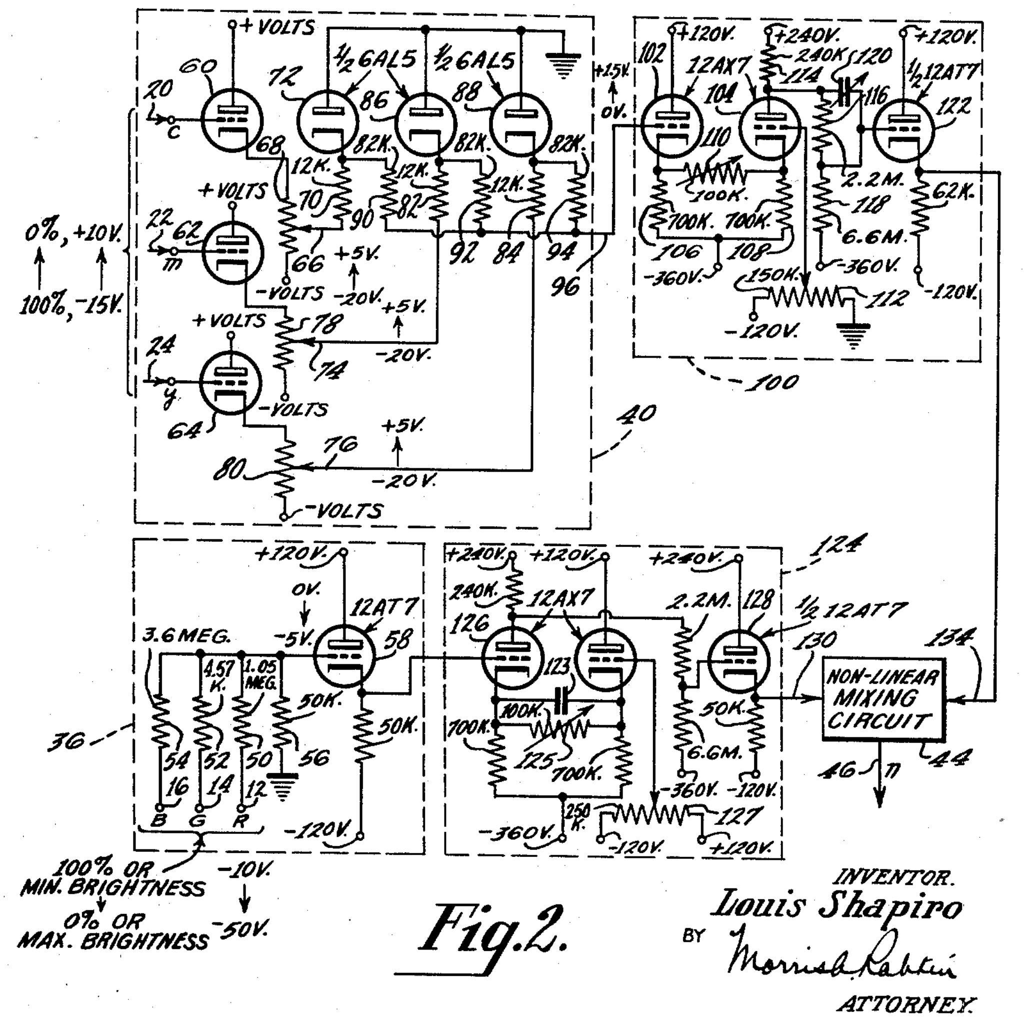
Figure 2 is a schematic circuit diagram of portions of the system shown in Figure 1.

In Figure 2, a schematic circuit diagram is shown of the brightness signal circuit 36, the saturation signal circuit 40, and their respective amplifier circuits 124 and 100. The brightness signal circuit 36 may include three summing resistors 50, 52, and 54 that have terminals respectively connected to terminals of the R, G, B channels 12, 14, and 16. The other terminals of these summing resistors 50, 52, and 54 are connected together to a terminal of a load resistor 56, the other terminal of which is connected to a reference potential terminal shown as ground. The common terminal of the summing resistors 50, 52, and 54 is also connected to the grid of a cathode follower circuit 58. The voltage that is applied to the grid of the cathode follower 58 is proportional to a weighted sum of the R, G, B signals. The values of these resistors 50, 52, and 54 are chosen to provide a brightness signal that is weighted in accordance with certain proportions that are generally considered to be the characteristics of the green receptor of the human eye. This weighted brightness signal produced by the parameters shown in Figure 2 is made up of approximately 28% of the red signal, 64% of the green signal, and 8% of the blue signal in accordance with the spectral characteristics of the primary colors, red, green, and blue, that are used.

In the saturation signal circuit 40, three cathode follower circuits 60, 62, and 64 receive voltages at their respective grids that are *c*, *m*, and *y* signals from the ink channels 20, 22, and 24. An adjustable tap 66 on the cathode resistor 68 of the *c*-signal cathode follower 60 is connected through a resistor 70 to the cathode of a limiting diode 72; the anode of this diode 72 is connected to ground. In a similar manner, adjustable taps 74 and 76 of the cathode resistors 78 and 80 are connected by way of resistors 82 and 84 to the cathodes of diodes 86 and 88, respectively. The anodes of these diodes 86 and 88 are also connected to ground. The cathodes of all three diodes 72, 86, and 88, are connected through separate summing resistors 90, 92, and 94 to a common connection 96. The diodes 72, 86, 88 limit the ink signals to voltage excursions above ground, and the resistor network 90, 92, 94 produces a voltage at the connection 96 that is approximately proportional to the average of these positive voltages.

The output 96 of the saturation signal circuit 40 is connected to a saturation amplifier circuit 100. This amplifier 100 includes two triodes 102 and 104 having a common cathode impedance network made up of two resistors 106 and 108 respectively connected between the cathodes of the tubes 102 and 104 and a negative voltage supply. This network also includes an adjustable resistor 110 connected between the cathodes of the tubes, whereby the gain of the amplifier 100 is adjusted. The grid of the tube 102 receives the varying output of the saturation circuit 40. The grid of the tube 104 receives a constant voltage supplied from a potentiometer 112, which serves to supply an appropriate direct voltage level to the varying signal. The output of the amplifier consisting of triodes 102 and 104 is taken by means of a voltage divider that includes the anode load resistor 114 of the tube 104 in series with two other resistors 116 and 118. A capacitor 120 is connected across the middle resistor 116 to afford a suitable frequency response. The junction of the resistors 116 and 118 is connected to the grid of a cathode follower 122, from the cathode of which the amplifier output is taken on the connection 134, and supplied to the mixer 44.

The brightness signal produced by the circuit 36 is amplified in an amplifier circuit 124 of the same general type as the amplifier 100. To assure proper signal phase relationships the amplified output is derived from the anode of the tube 126, whose grid receives the varying brightness signal from the circuit 36. Otherwise, the circuit 124 is substantially the same as the circuit 100 described above; the gain adjustment resistor 125 is shunted by a capacitor 123, and the capacitor 120 of the amplifier 100 is not used in the circuit 124. The capacitor 123 is used to ensure proper frequency response; other resistors, such as the resistors 50, 52 and 54 may be shunted in a similar manner for the same purpose. The output of the amplifier circuit 124 is taken from the cathode of a cathode follower 128 and supplied by way of the connection 130 to the mixer 44.

Figure 3:
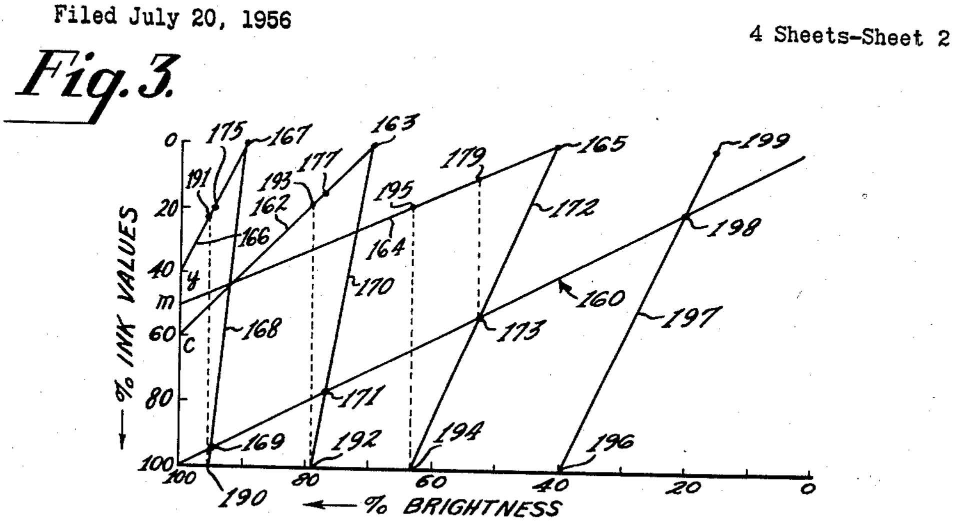
Figure 3 is an idealized graph used to explain the operation of the circuits of Figure 2.

Reference is made to the graph of Figure 3 for the purpose of explaining colorimetrically the mode of operation of the circuits shown in Figure 2. The following colorimetric explanations are the best presently available that appear suitable to explain the observed phenomena. In the graph of Figure 3, the brightness, or luminance, function is plotted along the abscissa coordinate and ink values are plotted as the ordinates. The ink values are plotted as percentiles; these percentiles are used to define the amount of ink applied to a unit area. For example, in a half-tone printing process, 100% ink corresponds to full ink coverage of the half-tone unit area; lesser percentiles are proportionate coverage of that unit area; and 0% represents the absence of ink in the unit area. For convenience in relating the R, G, B signals to the ink signals, percentiles are also used for these R, G, B signals and for the brightness function derived therefrom. The R, G, B percentiles represent the proportionate amount of the possible range of these R, G, B inputs to the computer 18. For convenience in relating the ink signals and the R, G, B signals to each other, increasing percentiles in each case represent decreasing brightness. Thus, 0% in each of the R, G, B, and brightness signals represents a maximum brightness value of the signal, and 100% represents minimum brightness.

In Figure 3, the line 160 represents values of black ink plotted against the brightness function under conditions of minimum or low saturation, or purity. This graph 160 may be considered as the function that would be generated at the connection 130 by the brightness signal circuit 36 and the amplifier 124. This graph 160 is the brightness, or luminance, function, $$L=28\%R+64\%G+8\%B$$

for values of R, G, and B ranging from 0% to 100% from maximum to minimum brightness.

Let us consider a condition of all the inks being present at maximum amounts; that is, a condition in which the computer 18 is set up to produce a combination of inks corresponding to the black limit of the printed reproduction. In one representative segments of the printing industry, an appropriate combination of inks representing this black limit of 100% brightness (i.e., minimum brightness) is 60% of *c*, 50% of *m*, 40% of *y*, and 100% of *n*. This set of values is the origin of the graph 160 in Figure 3; the condition that exists when $R=G=B=100\%$. (In the computer of the aforementioned U.S. Patent No. 2,431,561, the ink values of 0% and 100% are limits that are not generally reached in practice due to a pulse-duration mode of ink value representation. Actual limits of ink values are approximately 1% and 99%. However, for simplicity of presentation, the limits of 0% and 100% are described as though they actually occur, and as they might occur in a different type of computer.)

The relationships of the R, G, B and ink spectral characteristics are such that the increase of red in the original subject corresponds generally to a decrease of cyan in the printed reproduction; an increase of green to a decrease of magenta; and an increase of blue to a decrease in yellow; in terms of percentiles, R and *c*, G and *m*, and B and *y* tend to change together to a first approximation. Due to the overlapping spectral characteristics of the inks and of the original color separation filters, a change in *c* actually corresponds to second order changes in G and B as well as the main, first order, change in R.

With these ink and light-value relationships in mind, it is seen that a change in the cyan ink from the black-limit value of 60%, at the origin, to a value of 0% corresponds to, and is the result of, a change in the red brightness percentile from approximately 100% to 0%. That is, this change in *c* from 60% to 0% occurs with a reduction in the brightness function value L due to addition of the R component of approximately 28%; let us say, for the sake of example, 30%, to take into account certain second order effects that are due also to small reductions in G and B. Thus, the cyan function may be represented, as shown by the line 162 in Figure 3, changing from 60% to 0% of ink as the brightness function changes from 100% to 70% (corresponding to the R signal going from approximately 100% to 0%). In a similar manner, the magenta function may be plotted as line 164; *m* changes from 50% to 0% corresponding to a change in brightness from 100% to approximately 40% (the 64% coefficient of G rounded off); and the yellow function may be plotted as the line 166 with yellow changing from 40% to 0% as the brightness changes from 100% to 90% (the 8% coefficient of B rounded off). Actual quantitative relationships are contingent on choices of separation filters, spectral characteristics of inks and certain other spectral factors.

The graph 160 of the brightness function establishes one condition for the generation of black, *n*. Another condition is that when any of the computed ink values, *c*, *m*, or *y*, goes to 0%, *n* should also go to 0%. This condition may be explained in terms of saturation or purity: When one of the colored inks, *c*, *m*, *y*, goes to 0%, the printed color should be one of maximum or near-maximum saturation, or purity, and black should not be present. Consequently, the points 163, 165, and 167 of 0% ink for each of the *c*, *m*, any *y* graphs 162, 164, and 166 should also represent conditions of 0% black due to the computed colors indicating near-maximum saturation.

An initial condition that is now considered is the one mentioned above of all the inks being present to the maximum amounts. That is, the inks are 60% of cyan, 50% of magenta, 40% of yellow, and 100% of black. The brightness function is also 100% at these minimum brightness conditions; the point of 100% *n* and 100% brightness being the origin of the graph 160 of Figure 3. As the yellow ink *y* changes from 40% to 0%, the brightness function L changes from 100% to 90% along the brightness curve 160, as noted above (there may be increases in the computed values of *c* and *m* from the black limit values, which increases are due to the various changes taking place). At $L=90\%$, the value of black *n*, along the graph 160, is approximately 90%. However, as yellow goes to 0% at point 167, a condition of near-maximum saturation is reached, and the value of *n* should suddenly change to 0%. If *n* actually changed in this manner, the amount of change in *n* would be approximately 90% as the yellow ink changes the last percentile or so. Such a ratio of a change in black to a change in yellow ink exceeds the ratio that is desired by the industry, and tends to produce a black plate that is objectionable for the reasons noted above. It has been found that a tolerable ratio of the rate of change in black to the rate of change of any one of the colored inks (with the other two held constant) or to the combined rate of change of all the inks may range from approximately 2:1 to 10:1, or even greater, to meet different standards; for the purpose of this description, this ratio is assumed to be 5:1.

The conditions for the generation of the black signal as developed thus far may be summarized as follows: Black should be generated (1) in accordance with a brightness function, L; except that (2) in region of high or near-maximum saturation, when *c*, *m*, or *y* is near 0%, no black should be generated, and (3) the ratio of the rate of change of black as it approaches 0% to the rate of change in the colored ink or inks should not exceed a certain value (which is assumed to be 5:1).

The graph 168 is a line that has a slope that is five times the slope of the *y* graph 166, and that has a 0% ink value at the same L value as the *y* graph 166. This graph 168 intersects the brightness function graph 160 at a point 169 corresponding to a brightness value of approximately 95%. An extension of this graph 168 intersects the brightness axis at point 190, which is also at approximately 95% brightness. This graph 168 between the points 169 and 167 represents a curve that the black ink function may follow under the conditions that black ink is to go to 0% as only yellow ink goes to 0% (at the same brightness values) and a 5:1 ratio of their rates of change is not to be exceeded.

In a similar manner, the graph 170 represents a black ink function that goes to 0% under the conditions that only cyan ink goes to 0% (at the same brightness values), and the ratio of their rates of change does not exceed 5:1. This function 170 crosses the brightness graph 160 at a point 171 corresponding to a brightness value of approximately 78%, and, at a brightness value of 70%, the cyan and black inks both reach 0%. An extension of graph 170 intersects the brightness axis at point 192, which is at about 80% brightness. The graph 172 represents the black ink function that goes to 0% under the conditions that only magenta ink goes to 0%, and the ratio of the black ink change to the magenta ink change does not exceed 5:1. The graph 172 crosses the brightness graph 160 at a point 173 corresponding to a brightness value of approximately 53%, and the magenta and black inks both reach 0% at a brightness value of 40%. An extension of graph 172 intersects the X axis at the point 194, which is at about 65% brightness. The points 190, 192 and 194, at the intersections of the brightness axis and the extensions of the respective lines 168, 170 and 172, represent points at which the inks *y*, *c*, and *m* have values that call for a departure of black from 100% due to the start of the saturation effects. Such "saturation starting" points are shown in Figure 3 to be on the brightness axis. For various black printer characteristics, such starting points may be below this brightness axis and correspond to a theoretical ink percentage of more than 100%. The ordinate erected at the saturation starting point 190 intersects its associated yellow ink graph 166 at the point 191, at which *y* is about 21%. Similarly, the ordinate erected at the saturation starting point 192 intersects the associated cyan curve 162 at 193, where cyan has a value of about 20%; and the ordinate erected at the starting point 194 intersects the associated magenta curve 164 at 195, where magenta has a value of about 19%.

The intersections 169, 171 and 173 of the graph 160 and the respective lines 168, 170 and 172 represent "crossover" points at which dominant control of percentage black ink should pass from the brightness curve 160 to the associated one of the saturation curves 168, 170, 172 as the brightness changes in the direction of decreasing percentage.

At the brightness value of each of these "saturation control" points 169, 171, and 173, there is an associated point 175, 177, and 179 on the graphs 166, 162, and 164, respectively. The value of yellow ink at the point 175, which corresponds to the associated saturation control point 169, is approximately 20%. At this value of yellow, 20% (*c* and *m* having values that are equal to or greater than 60% and 50%, respectively), the function shown as the graph 168 should start to dominate the generation of black ink. In a similar manner, corresponding to the saturation control point 171 is the point 177, at which the cyan value is approximately 17%. Likewise, corresponding to the saturation control point 173 is the point 179, at which the magenta value is approximately 12%.

The point 196 may be considered a saturation starting point corresponding to a brightness value at which all three inks are at their saturation starting values at the same time. The line 197 has the same slope as the magenta saturation curve 172, and represents the extreme case of magenta going to zero from the point 196. The crossover point 198 is generally at the smallest brightness percentile at which the brightness function can dominate the generation of black. The point 199 is at the smallest brightness percentile at which a black ink value is to be generated with the parameters indicated above. Actually a "pastel" color condition may exist at somewhat higher brightness percentiles than these, and this "pastel" condition would call for 0% black, as indicated below.

The operation of the saturation signal circuit 40 and its amplifier 100 substantially in accordance with the graphs 168, 170, and 172 is now described. A particular set of circuit parameters is shown in the circuit of Figure 2 (and in Figure 6, described below) in order to illustrate and operative embodiment of this circuit and of the system of this invention and, also, to simplify the presentation and explanation. For the parameters shown, the R, G, B signals in the channels 12, 14, and 16, each may range from −10 volts to −50 volts corresponding to a brightness range in the original subject being scanned that goes respectively from minimum brightness to maximum brightness. The resulting output of the summing network applied to the grid of the cathode follower 58 varies approximately from 0 volts to −5 volts corresponding to a brightness signal range from minimum to maximum brightness. The arrows that indicate these and other signal ranges in Figure 2 (and in Figures 4 and 6) point to the signal values of smallest percentile (corresponding generally to maximum brightness or maximum saturation, as the case may be) and point from the signal values of largest percentile (minimum brightness or saturation).

The diodes 72, 86, and 88 of the saturation signal circuit 40 are respectively associated with the cyan, magenta, and yellow signals. The diode 88 associated with the yellow signal limits negative excursions of that signal at the cathode diode to substantially ground potential. Voltages above ground are not limited, and contribute to the signal on the connection 96. These positive voltages at the cathode of the diode 88 correspond to the yellow values between the saturation starting value of 21% and 0%. Over the portion of this range from 20% to 0% of *y*, the graph 168, extending from the saturation control point 169 to the 0% point 167, calls for black ink values that are less than those called for by the graph 160 over the corresponding range of brightness values. The diode 88 effectively limits the voltages corresponding to the yellow values in excess of 21%, so that the only contribution (except for a contribution, noted hereinafter, due to the "toe" of the diode characteristic, or some other type of smoothing mechanism) of the yellow signal to the saturation signal generated at the connection 96 is the contribution of those yellow signal values corresponding to yellow between about 21% and 0%.

The yellow signal voltage in the computer output channel 24 may vary approximately from −15 volts to +10 volts as yellow varies from 100% to 0%. The adjustable tap 76 on the resistor 80 is adjusted to be at ground potential at a yellow ink value of 21%, such that the voltage value corresponding to the saturation control point 169 of yellow ink corresponds to substantially 20% of yellow. As a result of this adjustment of the tap 76, the voltage there varies approximately from −20 volts to +5 volts as yellow varies from 100% to 0%. However, due to the limiting action of the diode 88, only the portion of this voltage range from approximately ground to +5 volts (*y* values of 21% to 0%, respectively) contribute to the saturation signal at the connection 96.

The tap 74 for the magenta signal is adjusted to be at ground potential when magenta reaches the saturation starting value of 19%. This adjustment of the tap 74 results in a voltage range at that tap 74 also of approximately −20 volts to +5 volts as magenta varies from 100% to 0%, and a voltage range of approximately ground to +5 volts (*m* values of 19% to 0%, respectively) at the cathode of the limiting diode 86. In a similar manner, the tap 66 for the cyan channel is adjusted to have a voltage range from approximately −20 volts to +5 volts as cyan varies from 100% to 0%, so that this tap 66 is at ground potential when cyan equals 20%. Thus, the voltage at the cathode of the diode 72 ranges approximately from ground to +5 volts (*c* values of 20% to 0%, respectively). The points 163, 165, and 167 at which black and a respective one of the inks *c*, *m*, and *y* go to 0% together may be used as fundamental points for setting up the equipment. Trimming adjustments of these taps 66, 74, and 76 ensure that the black signal goes to 0% when *c*, *m*, or *y* goes to 0%; and these adjustments may result in appreciable variations of the voltage ranges set forth above. However, these adjustments are necessary to ensure proper operation from the fundamental points 163, 165, and 167.

The limited voltages at the cathodes of the diodes 72, 84, and 88 are averaged by the network that includes the resistors 90, 92, and 94 to provide an average voltage at the common connection 96. The voltage at the common connection 96 varies approximately from about ground potential to +1.5 volts corresponding to a total of the cyan, magenta, and yellow ink values of from approximately 60% (21%+20%+19%) to 0%, the condition of 60% being reached when each of the inks is at or greater than its respective saturation starting value. Thus, for each of the three inks *c*, *m*, and *y*, there is an average saturation starting value of approximately 20%. A voltage level of +0.5 volt at the common connection 96 signifies that one or more of the ink values has passed into the saturation control range, and that one of the following conditions exists: (1) a reduction of 20% in one of the inks from the associated saturation starting value (which means that one of the inks has gone to approximately 0%, and a maximum or near-maximum saturation condition exists); or (2) all three inks are reduced to approximately 13% each (which is a so-called "pastel" region where no black is normally desired); or (3) some equivalent condition requiring no black ink is reached. Thus, as the signal level at the saturation signal connection 96 of the circuit 40 varies from ground (the saturation starting potential) to +0.5 volt, the generation of the black signal should be controlled in accordance with one of the graphs 168, 170, or 172 of Figure 3, or in accordance with some combination of these graphs.

The setting of the gain adjustment resistor 110 of the saturation amplifier 100 (relative to the setting of the gain adjustment resistor 125 of the brightness amplifier 125) supplies the proper factor to the rate of change of the saturation signal. This factor, as indicated above, is approximately five, so that percentagewise the black ink values represented by the signal at the output connection 134 of this amplifier 100 change at approximately five times the rate of change of the percentage ink values represented by the saturation signal at the connection 96.

Additional flexibility of operation may be achieved in the saturation sensing circuit 40 of Figure 2 by assigning different values to the resistors 90, 92 and 94. In this manner, speed of control of black by the saturation signal may be made dependent upon which ink is being withdrawn to cause this saturated condition.

The graphs 168 to 172 in Figure 3, as discussed thus far, do not take into account the "toe" of the diode transfer characteristic in the cutoff region of the diode. As a result of this "toe" in the diode characteristic, the voltage at the cathodes of the diodes 72, 86, and 88 and the saturation circuit 40 approach the nominal cutoff value gradually. Due to this "toe," these limiting diodes 72, 86, and 88 actually permit portions of the ink signals corresponding to values that are greater than the aforementioned saturation starting values of 20%, 19%, and 21% for cyan, magenta, and yellow, respectively, to contribute, on a non-linear basis, to the saturation signal at the connection 96. Consequently, the graphs 168, 170, and 172 tend to have some curvature in the regions of the saturation starting points, which curvature may extend to the saturation control points 169, 171, and 173.

Figures 4, 5, 6:
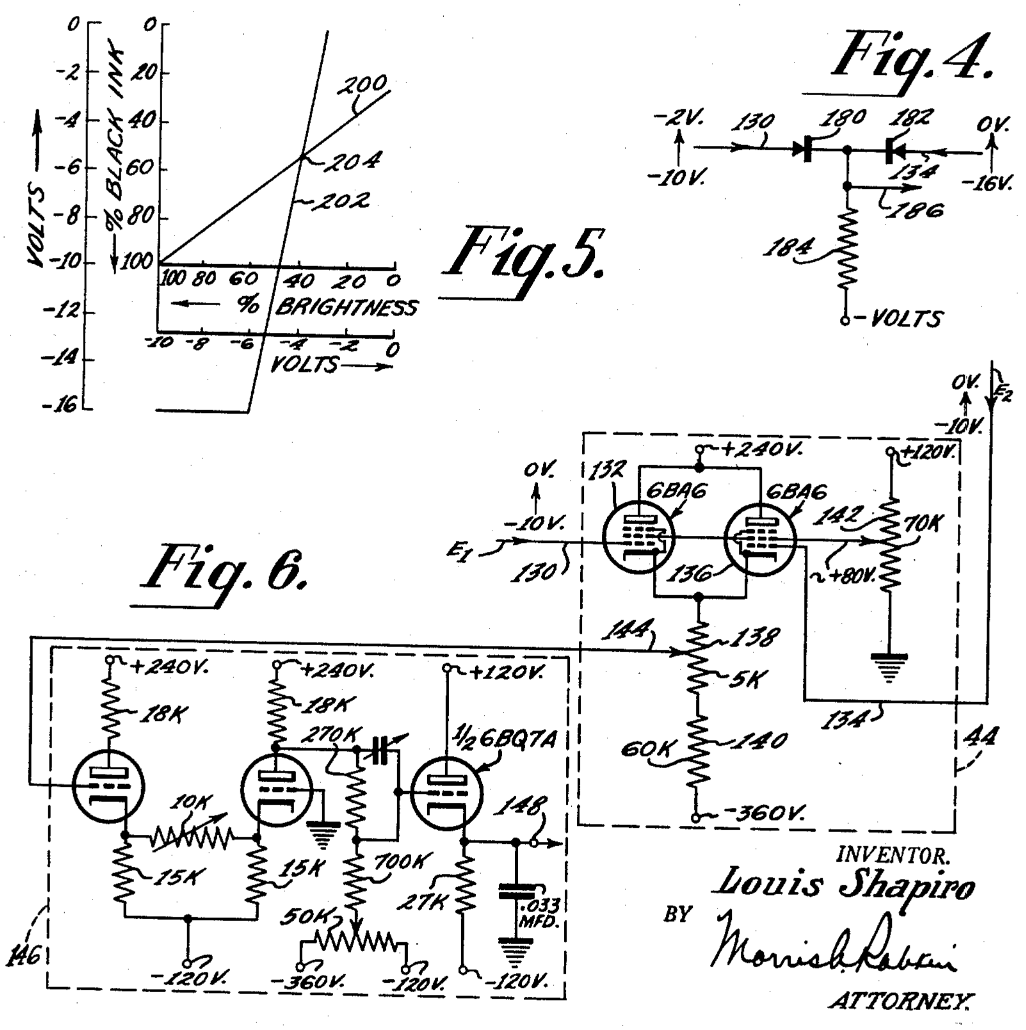
Figure 4 is a schematic circuit diagram of one form of mixer circuit that may be used with the circuits of Figure 2.
Figure 5 is an idealized graph used to explain the combined operation of the circuits of Figures 2 and 4.
Figure 6 is a schematic circuit diagram of another form of mixer circuit that may be used with the circuits of Figure 2, and which embodies this invention.

A form of non-linear mixer 44 that may be used in the system of Figure 1 and with the circuits of Figure 2 is shown in Figure 4. This circuit, known as a "maximum selector" circuit, includes two diodes 180 and 182 connected together at their cathodes to a common load resistor 184. Separate input voltages (the brightness and saturation signals) at the connections 130 and 134 are applied to the anodes of the diodes 180 and 182. The output voltage is derived at the connection 186 at the cathodes of these diodes across the common load resistor 184.

In the circuit of Figure 4, the output voltage at the connection 186 is approximately the maximum one of the input voltages at the connections 130 and 134. That is, if the diode 180 receives the more positive input voltage from the connection 130, this diode 180 conducts, and its cathode rises approximately to that input voltage. The cathode potential of the diode 182, is also approximately the input voltage at the connection 130, which, it has been assumed, is more positive than the input voltage at the connection 134. Therefore, the diode 182 is cut off. In a similar manner, when the input voltage at the connection 134 is greater than that at the connection 130, the diode 182 conducts, and the diode 180 is cut off. Accordingly, the output voltage at the connection 186 is approximately equal to the maximum one of the two inputs.

By means of appropriate settings of the gain adjustment resistor 125 and the direct-voltage-insertion potentiometer 127 in the amplifier 124 (Figure 2) together with the corresponding settings of the gain resistor 110 and the direct-voltage-insertion potentiometer 112 of the amplifier 100, the voltages on the connections 130 and 134 are related somewhat in accordance with the relationships of the brightness function graph and the saturation graphs 168, 170, and 172. For any one set of adjustments of the amplifiers 100 and 124, the circuits of Figure 2 may be operated with a "maximum selector" mixer such as that of Figure 4 to generate black in accordance with the general ramifications of the relationships of these graphs of Figure 3. A particular set of adjustments of these amplifiers 100 and 124 may result in certain simplifications in the overall operation, and various adjustments may produce different black printers, as desired. Generally, the points 163, 165, and 167, at which the respective inks *c*, *m*, and *y* and black are 0%, remain unchanged, and the gain of the amplifier 100 which determines the slope of the lines 168, 170, and 172, also remains unchanged. The direct voltage levels, however, may be adjusted to provide various positions of the saturation starting points 190, 192, and 194 with respect to the brightness axis.

One set of adjustments of the amplifiers 100 and 124 may be such that these circuits 100 and 124 produce, for example, a brightness signal ranging from −10 volts to −2 volts, corresponding linearly to brightness values ranging from 100% to 0%, and a saturation signal ranging from −16 volts to 0 volts, corresponding respectively to a saturation starting value and a near-maximum saturation value. The choice of −17 volts has the effect of placing the saturation starting points 190, 192, and 194 well below the brightness axis. The points 163, 165, and 167, and the slopes of the lines 168, 170, and 172 remain unchanged from that shown in Figure 3. However, the *c*, *m*, and *y* values (represented by the points 191, 193, and 195) corresponding to the new positions of the starting points 190, 192, and 194 are larger percentiles than for the parameters corresponding to Figure 3. A maximum-selector output signal at the connection 186 ranging from −10 volts to 0 volts is used to generate a black signal ranging from 100% to 0%, respectively.

Reference is made to Figures 5 and 3 to summarize the combined operation of the circuits of Figures 2 and 4 for this particular set of voltage ranges. The idealized graph 200 (Figure 5) represents the generation of black ink values, through the maximum-selector circuit, as a function of the brightness signal, the abscissa values representing the brightness function values, and the ordinates representing both the input voltages at the connection 130 of the maximum-selector circuit and the corresponding output black-signal percent values. The idealized graph 202 represents one possible case of generation of the saturation signal, and is a plot of input voltage, at the connection 134 of the maximum-selector circuit, against corresponding brightness values.

For any given combination of R, G, and B input values, the circuits 36 and 124 operate to produce a brightness signal at the connection 130 that varies from −10 volts to 2 volts. For this same set of R, G, and B input values, the color-correction computer 18 generates a consistent set of *c*, *m*, and *y* values. The saturation circuits 40 and 100 operate with these *c*, *m*, and *y* values to produce at the connection 134 a voltage that may vary within the range of −16 volts to 0 volts. The maximum selector circuit of Figure 4 receives these brightness and saturation signal voltages at the connections 130 and 134, and produces at the output connection 186 a voltage which is substantially equal to the maximum one of these voltages at the connections 130 and 134. The useful output voltage at the connection 186 may vary from −10 volts to 0 volts, which range is used to generate black ink from 100% to 0%, respectively. The signal at the connection 186 may be used to derive an *n* signal voltage at a voltage level appropriate for feedback to the computer 18 in the manner outlined above with respect to Figure 1.

In Figure 5, the change in brightness from 60% to 35% is, for the sake of example, considered to be due to certain spectral variations in the subject being scanned, which variations are designed to be of such nature as to cause the saturation channel to be activated and to develop the full range of saturation signal. This signal rises from −16 volts at $L=60\%$ to 0 volts at $L=35\%$. As previously indicated, the development of the saturation signal during the 60–35% brightness range as shown by the graph 202 represents only one of a large number of discernibly different spectral changes which are possible during normal scanning operation of the equipment. Other saturation signal graphs corresponding to the special cases represented by the graphs 168, 170, 172 of Figure 3 may be readily constructed in a similar manner for the voltage ranges applicable to Figure 5. Those spectral changes which result in the computer 18 generating one or more percentage ink values that reach or pass their saturation starting points are changes which result in the development of a saturation signal. The quiescent value of this signal is −16 volts, and represents a spectral condition of all ink values being greater than (or equal to) the saturation starting values. Saturation signal voltages less than −10 volts do not affect the voltage at the maximum-selector output 186. When a saturation condition starts to develop, a saturation starting point for one of the inks is reached and passed, and the saturation signal at the connection 134 moves in a positive direction from −16 volts. At the crossover point 204 (40%L), this saturation signal takes control of the output of the maximum selector circuit away from the brightness signal, and drives black in the direction of ground potential or 0%. After this 0% *n* value has been reached, additional reductions in ink values have no further effect in terms of black ink percentages.

Starting at minimum or 100% brightness, the behavior of the black ink output of the maximum-selector circuit may be traced as the brightness percentiles decrease. From 100% to 60% brightness (for the particular single example of spectral change illustrated in Figure 5), the black-signal output of the maximum selector follows the brightness signal, while the saturation signal remains at −16 volts. From 60 to 40% brightness, the black signal continues to follow the brightness signal, although the saturation starting point has been reached and the saturation signal is rising at this time. At 40% brightness, the saturation signal overtakes the brightness signal (voltage-wise), and, from then on, the black-ink output signal of the maximum selector follows this saturation signal. With further decrease in percentage brightness, the saturation signal rapidly brings black up toward zero percent ink, finally reaching this value at $L=35\%$.

In the general case of operation of the maximum selector of Figure 4 with the voltages indicated in Figure 5, the saturation signal curves may develop in such a way as to cross the luminance curve anywhere from approximately 95% to 20%. Hence, the generation of black ink is controlled only by the brightness signal in the region of 100% to 95% brightness; this unilateral control of black by the brightness signal in this region is insured by the −16 volt saturation starting values, because the saturation signal diode 182 is clearly nonconducting under these conditions. Black ink generation is controlled only by the saturation signal in the region of brightness values less than 20% because the brightness signal diode 180 is cut off under these conditions. In the region of 95% to 20% brightness, either signal may control black depending upon the position and slope of the saturation curve—these latter two saturation parameters are determined by the particular spectral distribution which is added or substracted for the change in brightness which is involved; that is, these parameters are determined in accordance with one or more graphs such as the graphs 168, 170, and 172 of Figure 3. Due to the choice of −16 volts for the saturation starting voltages and −2 volts for the maximum brightness voltage, there are modifications of the control of black signal generation by the saturation and brightness signals from the controls suggested by the graphical relationships of Figure 3. These modifications may be described generally as an ensured brightness signal control in the generation of large black ink percentiles and a reduction in such brightness signal control in the generation of small black ink percentiles. Generally, there is a great deal of flexibility in the choice of the signal ranges that may be used.

The black printer produced with the maximum selector circuit used as the non-linear mixer 44 may not be the best black plate possible when considered from the standpoint of carrying the greatest amount of detail. Generally an important function of the black plate is to carry as much detail as possible in order to relieve the more expensive colored inks of this function, which function the black ink is best equipped to perform. The "maximum selector" mode of mixing the brightness and saturation signals involves discarding certain information, the information represented by the minimum signal which is not selected. This mode of operation, therefore, may result in the loss, for example, of significant luminance information in a region where the saturation signal is somewhat greater than the luminance signal but not completely dominant. Likewise, under the circumstances of the luminance signal being slightly greater than the saturation signal, the value of the saturation signal does not affect the generation of the black ink with a maximum selector mixer.

Another non-linear mixer that may be employed with the circuit of Figure 2 is shown in Figure 6. The circuit connection 130 from the brightness signal amplifier 124 (Figure 2) is connected to the first grid of a first remote cutoff pentode 132. The circuit connection 134 from the saturation amplifier 100 is connected to the first grid of a second remote cutoff pentode 136. The anodes of these tubes 132, 136 are connected to the positive terminal of a source of operating potential. The cathodes of these tubes 132, 136 are connected together and by way of an adjustable resistor 138 and a fixed resistor 140 to the negative terminal of a source of operating potential. The third grids of the tubes 132 and 136 are connected to their respective cathodes. The second grids, or screens, of these tubes 132 and 136 may be supplied with a fixed potential from a potentiometer 142.

The transfer characteristics of a remote cutoff tube are discussed and shown graphically in the book "Theory and Applications of Electron Tubes" by Reich, 2nd ed., 1944, McGraw-Hill, at page 55. The remote cutoff tube, also known as a variable-mu tube, is compared with the sharp cutoff tube at the same page in this book. In a remote cutoff tube, the transfer characteristic (plate current against grid voltage) approaches the grid-voltage axis very gradually, so that there is an extended usable "toe" region to the characteristic over a large grid-cathode voltage range. This transfer characteristic of a remote cutoff tube may be described roughly as made up of two somewhat linear regions having different slopes, which linear regions are separated by a non-linear region whose slope varies from one to the other of the different slopes. The sharp-cutoff tube characteristic approaches the grid-voltage axis very sharply, so that there is effectively no usable "toe" region; that is, the "toe" region exists for perhaps but a small fraction of a volt.

The signal produced at the adjustable tap 144 of the cathode resistor 138 is used for the black signal *n*. The signal at the tap 144 is amplified in an amplifier circuit 146 that is generally of the same type as the amplifier circuit 100 described above. The amplifier circuit 146 also supplies appropriate direct voltage levels to this *n* signal such that the signal developed at the output terminal 148 of this amplifier 146 is appropriate for application to the aforementioned color-correction computer 18.

Figure 7:
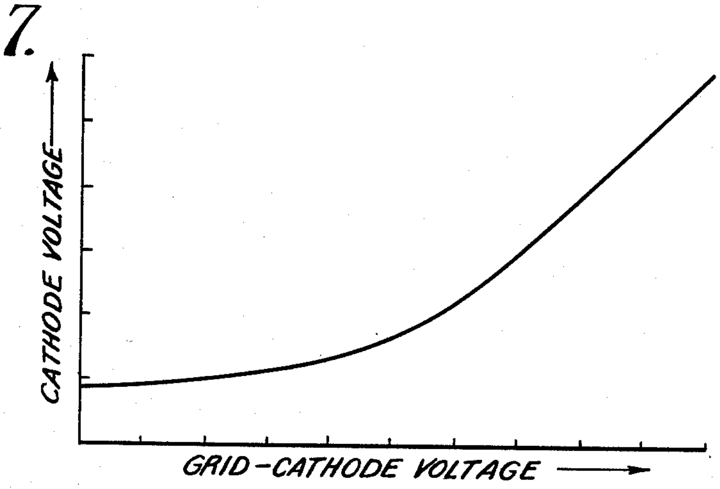
Figure 7 is an idealized graph used to explain the operation of the non-linear mixing circuit shown in Figure 5.
Figure 8:
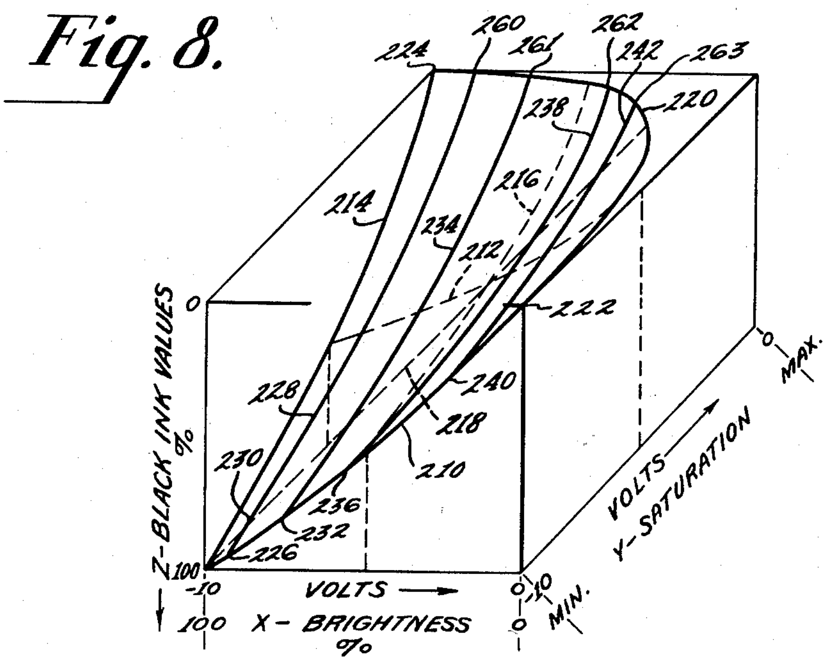
Figure 8 is an idealized graph in three dimensions used to explain the operation of the non-linear mixer circuit shown in Figure 5.

Reference is made to Figures 7 and 8 to explain the operation of the non-linear mixer of Figure 6 especially when considered together with the circuits of Figure 2. The idealized graph of Figure 7 is the grid-cathode voltage transfer characteristic of the mixer of Figure 5 with the voltage on one of the inputs 130 and 134 varying over an extended range, and the voltage at the other held constant at an intermediate value. The idealized graph of Figure 8 is in three dimensions and has an X or brightness axis, a Y or saturation axis, and a Z or black in value axis. The graph in Figure 7 is plotted for brightness and saturation voltage ranges at the connections 130 and 134 that are equal; the mixer circuit may also be operated with unequal input voltage ranges. The brightness voltage range is from −10 volts to 0 volts corresponding respectively to brightness values from 100% to 0%. The saturation voltage range likewise is from −10 volts to 0 volts corresponding respectively at these limits to conditions of minimum and maximum saturation values that affect the generation of black.

The origin of the graphic surface of Figure 8 is at the point of 100% brightness and minimum saturation (−10 volts, −10 volts, respectively). The black ink value at this origin point is likewise 100%. The curve 210 represents the mixer output for the full range of the input at the connection 130 and a constant minimum voltage input, −10 volts, at the connection 134; this graph 210, thus, lies in the front, vertical plane of the cube formed by the X, Y, and Z axes and the parallel set of axes corresponding to the limits of the ranges being considered. The curve 212 (shown in broken lines) is the mixer output over the voltage range at the input 130, and with the input 134 receiving a constant voltage that is midway in its range; the plane of the curve 212 is parallel to the front plane at a central position. The curve 214 represents the output of the mixer circuit over the full range of the input at the connection 134 with the input at the connection 130 held constant at the low voltage end −10 volts, of its range. The curve 216 is the mixer circuit output for the voltage range at the input 134 with the input 130 held constant at an intermediate voltage level. These curves 210, 212, 214, and 216 correspond to different portions of the graph shown in Figure 7. The curves parallel to the Y axis in Figure 8 are distorted due to the three dimensional representation; this may be seen from the condition that the curves 210 and 214 should have the same curvature due to the symmetrical mode of operation of the mixer circuit of Figure 6. The broken-line curve 218 is a straight line representing the operation of this mixer with both input voltages varying and having equal values over the entire range; the graphic surface of Figure 8 is symmetrical about the line 218. The curve 220 extends in the plane of 0% black ink, and is the intersection with that plane of the curved graphic surface of the function generated by the mixer circuit. This curved surface includes values that cannot be generated by the mixer circuit of Figure 6 when used together with the circuits of Figure 2 in this color correction system. This limitation on the range of operation of the mixer under these circumstances is due to the fact that the input voltages at the connections 130 and 134 are not independent variables; that is, the *c, m,* and *y* values that determine the voltage at the connection 134 are computed from the R, G, and B values that determine the voltage at the connection 130. Thus, for example, the limiting point 222 representing 0% brightness and minimum saturation is not a real condition. Likewise, the point 224 representing 100% brightness and maximum saturation is not a real condition.

The operation of the mixer of Figure 6 together with the circuits of Figure 2 is described with reference to the three dimensional graph of Figure 8 and, also, to the graphs of Figure 3 and to the previous discussion of the saturation starting points 190, 192, and 194 and the saturation control points 169, 171, and 173 in that Figure 3.

The construction of the graphic surface of Figure 8 and the associated design and adjustments of the mixer circuit of Figure 6 for operation with the circuits of Figure 2 are performed with the same fundamental points and parameters as those discussed with respect to Figure 3. Namely, the points of 0% congruence of the respective inks *c*, *m*, and *y* with black ink (the points 163, 165, and 167 of Figure 3) are first established in the same manner as described above with respect to Figure 2; that is, these points of 0% ink congruence, the points 260, 261, and and 262 in Figure 8, are established by trimming adjustments of the resistor taps 66, 74, and 76, respectively, in the saturation circuit 40 (Figure 2). Likewise, the gain adjustment of the saturation amplifier 100 determines generally the ratio of the rate of change of black to that of the inks, particularly in the region of the points of 0% congruence 260, 261, and 262.

Considering the previously discussed initial conditions of a brightness value of 100% and *c*, *m*, *y*, and *n* values fo 60%, 50%, 40%, and 100%, respectively, the operation is described first for the circumstances that the *y* ink goes from its initial value of 40%, to 0%, and *c* and *m* change only as required by the computer for correct colorimetric solutions. In the range of *y* from 40% to the associated saturation starting value, the saturation signal remains unchanged at its minimum saturation value. Accordingly, black is generated in accordance with the graph 210 from the origin point 226, which is the saturation starting point for yellow. At this yellow starting point 226, the black ink value function departs from the graph 210 and the plane of minimum saturation value, and starts to follow the graph 228. In the region of the graph 228 between the saturation starting point 226 and the "cross-over" point 230, the intersection with the line 218 of symmetry, the contribution to the output signal of the brightness tube 132 is somewhat greater than the contribution of the saturation tube 136. From this point 230 to the 0% black value at point 260 on the curve 220, the saturation tube 136 makes the greater contribution to the black ink signal that is generated. Cross-over point 230 is analogous to the saturation control point 169 (Figure 3). The greater the separation, voltage-wise, between the inputs 134 and 130, the greater becomes the importance of the contribution of the less negative input to the output signal; this mode of operation is discussed hereinafter. Thus, the output tends to follow the more positive one of the two inputs when these inputs are widely separated; when they are close together, these inputs tend to contribute equally to the output. The operation of the mixer circuit of Figure 6 is analogous to that of the maximum selector mixer of Figure 4 in that the extreme valued (that is, the maximum) one of the inputs tends to dominate the generation of the output. However, in the mixer of Figure 6, both inputs always make some contribution to the generations of the output.

This graph 228 represents one limit to the black ink function that can be generated with the mixer of Figure 6 and the circuits of Figure 2. This graph 228 and the portion of the graph 210 between the origin and the starting point 226 represent the black ink function changing from 100% to 0% under the condition of a minimum change in luminance.

Starting again from the aforementioned initial conditions with cyan changing from 60% to 0%, black ink is generated in accordance with the curve 210 from the origin to the point 232 representing the saturation starting point for cyan. From that point 232 to 0% cyan, the black ink function follows the curve 234 as the saturation signal changes from its minimum saturation value to its maximum saturation value. The point 236 on the curve 210 represents the saturation starting point for magenta, and the graph 238 represents the black ink curve as magenta changes from its saturation starting value to 0%. The point 240 corresponds to the point 196 in Figure 3, and represents the point at which all three inks are at their respective saturation starting values. The curve 242 represents the generation of black as the saturation signal changes from the minimum saturation value to the maximum saturation value from the luminance value represented by the point 240. The curve 242 and the curve 210 from the origin to the point 240 represent the boundary of the mixer circuit operation with the brightness value reaching a minimum percentage. The black ink generator that includes the circuits of Figures 6 and 2 does not operate along the portion of the curve 210 between the points 240 and 222; likewise, for example, this black ink generator does not operate along the graph 214.

The actual region of operation on the curved surface is that portion bounded by the curves 228, 242, 210, and 220. The curve 228 represents the suppression of black ink by the saturation signal for the least change in brightness (i.e., due to withdrawal of yellow ink), while the curve 242 represents the suppression of black by the saturation signal for the greatest change in brightness from the black limit. The saturation starting point of curve 242 is 240. This latter point is located by successively withdrawing the spectral equivalent of cyan, magenta, and yellow ink from the brightness function to the extent that each saturation control point is reached but not exceeded. If a controlling saturation signal is now generated by withdrawing the remaining magenta, 0% black is reached via curve 242, which represents the achievement of complete suppression of black ink for the smallest possible percentage of brightness.

The combined operation of the circuits of Figures 2 and 6 is such that the saturation signal contributes to the generation of the black ink signal between the respective saturation starting points 226, 232, 236, and 240 and the associated "crossover" points, and the brightness signal contributes to the generation of black between these respective "crossover" points and the points of 0% congruence 260–263 (in each case, unlike the maximum-selector operation). Therefore, the *c*, *m*, and *y* values corresponding to the saturation starting points 226, 232, and 236 are generally less than the starting values for the maximum-selector mode of operation.

At every point of the surface of operation of this mixer lying between the graphs 228 and 242 both tubes 132 and 136 contribute to the black ink value that is generated. The extent of contribution of each tube is a non-linear function of the separation voltage-wise between the two inputs. When the input values are close together, the tubes 132 and 136 tend to contribute substantially equally to the output; when the inputs are widely separated, the tube receiving the larger input voltage tends to dominate and be the primary control of the output voltage.

Generally in regions of minimum saturation, that is, where the *c*, *m*, and *y* values are greater than their respective saturation starting values, black is generated in accordance with the graph 210. However, when saturation is indicated by one of the computed ink values being reduced below its saturation starting value, the saturation control signal becomes progressively more important in its respective contribution to the black ink value; and, as 0% of black is approached, this saturation signal tends to dominate the generation of the black signal. There are no sharp lines of demarcation anywhere in the operation of the mixer as it generates the surface of the graph of Figure 8. The effect of the "toe" of the characteristic of the diodes 72, 86, and 88 in the saturation circuit 40 insures that the saturation signal departs gradually from the minimum saturation values as the inks approach their respective saturation control point values. This feature together with the curved characteristic of the mixer tubes 132 and 136 insures a smooth generation of the black signal over the entire range of operation generally in accordance with the principles discussed above with respect to Figure 3.

The circuit configuration of the non-linear mixer including the tubes 130 and 132 may also be used where these tubes 132 and 136 are sharp cutoff tubes instead of the remote cutoff tubes described above. With such sharp cutoff tubes, this circuit configuration has a mode of operation that is generally the same as the maximum-selector mode described above for the circuit of Figure 4. That is, with sharp cutoff tubes for the tubes 132 and 136, generally only one of the two tubes is conducting, that one receiving the more positive of the input voltages; but in regions of the inputs being substantially equal, both tubes conduct, and the output is proportional to the average of the two inputs.

Figure 9:
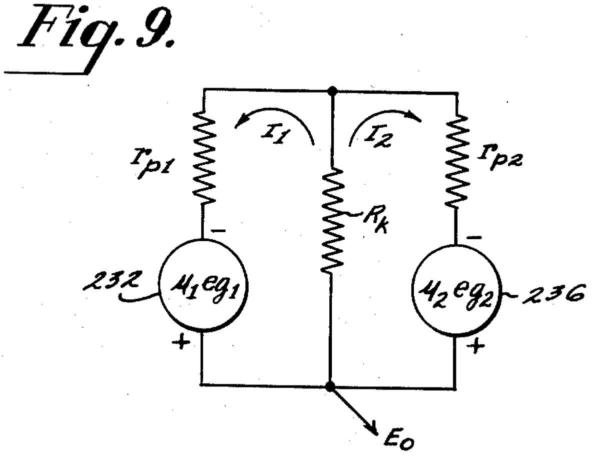
Figure 9 is a schematic circuit diagram showing an equivalent circuit of the non-linear mixing circuit of Figure 5.

In Figure 9, an equivalent circuit is shown for the plate current circuits of the mixer tubes 132 and 136 connected in circuit with the common cathode resistors 138 and 140 of Figure 6. These cathode resistors 138 and 140 are shown in Figure 9 as the resistor $R_k$. The input voltages $E_1$ and $E_2$ applied to the grids of the tubes 132 and 136 (Figure 6) are referred to a reference potential. The output voltage $E_0$ is assumed to be taken at the cathodes of the tubes 132 and 136 as indicated in Figure 9 for the corresponding generators 232 and 236, respectively.

The relationships between the grid-cathode voltages $e_{g1}$ and $e_{g2}$ and the input voltages $E_1$ and $E_2$ are as follows:

$$e_{g1}=E_1-R_k(I_1+I_2) \quad (1)$$

and $$e_{g2}=E_2-R_k(I_1+I_2) \quad (2)$$

where $I_1$ and $I_2$ are the respective plate currents. The voltage loop equations for the equivalent circuit of Figure 9 may be written as follows:

$$\mu_1 e_{g1}=(r_{p1}+R_k)I_1+R_kI_2 \quad (3)$$

and $$\mu_2 e_{g2}=(r_{p2}+R_k)I_2+R_kI_1 \quad (4)$$

Solving these equations for $I_1$ and $I_2$, the output voltage $E_0$, which is the result of the combined currents $I_1$ and $I_2$ flowing in $R_k$, may be written as follows:

$$E_0=R_k(I_1+I_2)=\frac{\mu_1 E_1 r_{p2}+\mu_2 E_2 R_{p1}}{\frac{r_{p1}r_{p2}+r_{p1}(1+\mu_2)+r_{p2}(1+\mu_1)}{R_k}} \quad (5)$$

This equation may be simplified by dividing through by the product of the two plate resistances, and by replacing the resulting $\mu/r_p$ ratios by the corresponding transconductances $g_{m1}$ and $g_{m2}$ as follows:

$$E_0=\frac{g_{m1}E_1+g_{m2}E_2}{g'_{m1}+g'_{m2}+\frac{1}{R_k}} \quad (6)$$

where $$g'_{m1}=\frac{1+\mu}{r_{p1}}$$

and $$g'_{m2}=\frac{1+\mu_2}{r_{p2}}$$

The reciprocal $R_k$ term in Equation 6 is negligible in comparison with the transconductances for the 6BA6 tube type used in the mixer circuit, and, therefore, this term may be neglected. Because of the high $\mu$ of the pentode tube type, the primed transconductances in Equation 6 are substantially equal to the unprimed transconductances. Thus, Equation 6 may be further simplified accordingly, and $E_0$ is substantially equal to the following:

$$\frac{g_{m1}E_1+g_{m2}E_2}{g_{m1}+g_{m2}} \quad (7)$$

This Equation 7 indicates that the importance of each input in its contribution to the output $E_0$ is directly associated with its transconductance. That is, the mixer circuit of Figure 6 is an adding circuit in that the output voltage is equal to the sum of the input voltages after each is modified by a certain factor. The factor for each input voltage is equal to the transconductance of the associated tube 132 or 136 divided by the sum of the transconductances for the two tubes 132 and 136. Inasmuch as the transconductance of the remote cutoff tube is a non-linear function of the grid cathode voltage, the operation of each tube of this adding circuit is non-linear, when the other tube's input is constant, as indicated in the graph of Figure 7. For the parameters shown in Figure 6, the $g_m$ of a tube is approximately 3000 micromhos at a grid voltage near 0 volts, and approximately 75 micromhos near −10 volts. As a result of this large difference between the transconductances of the tubes 132 and 136 at the two limits of the input range, the non-linearity of operation is also a function of the difference between the two input voltages. The greater the difference between the inputs, the greater is the contribution of the less negative voltage; the contribution of the more negative voltage is reduced by a factor substantially equal to the ratio of the transconductance of the associated tube to the transconductance of the tube receiving the less negative voltage. Thus, near the extremes of the input range, the contribution of the less negative voltage, say $E_1$, is only slightly affected by the transconductance $g_{m2}$ of the other tube, and the contribution of the more negative voltage $E_2$ is substantially reduced by the other transconductance $g_{m1}$ to a relatively small amount. In the condition of both input voltages $E_1$ and $E_2$ being equal, the addition performed by the mixer circuit of Figure 6 is on a substantially linear basis, since the transconductances in Equation 7 substantially cancel out. This equal-input mode of operation is indicated in the graph of Figure 8 by the "crossover" line 218, which represents the mixer output for equal input voltages.

For the particular parameters shown in Figure 6, the voltage across the cathode resistors 138 and 140 may vary only about 10 volts. Considering that the total voltage across these resistors 138 and 140 is approximately 360 volts, it is seen that this voltage variation of 10 volts is only about 3% of the total voltage drop. Thus, the combined current supplied to the cathode resistance by the tubes 132 and 136, $I_1+I_2$, is maintained substantially constant. This feature of substantially constant total current may be used to simplify the derivation of the characteristics of this circuit over the input voltage ranges.

The prominence in the above Equation 7 of the transconductances of the tubes 132 and 136 indicates the dependence of this mixer circuit on a stable and extended $g_m$ characteristic in the cutoff region of the remote cutoff type of tube. In contrast, the sharp cutoff tube type has neither a stable nor an extended region of this type. The accuracy and precision requirements of this circuit, as well as the overall operation of the system, is based on the minimum density difference discernible by the human eye in a printed reproduction. This minimum discernible density difference may be considered to be a basic criteria for an information signal unit, and corresponds approximately to 0.1% of ink.

In the black-printer use of this circuit, for a range of 100% ink, for example, 1000 such information signal units are required—ideally each unit held by an accuracy specification of about 5% (voltage-wise). With approximately half (500) of these information signal units in the high $g_m$ region and the other half in the low $g_m$ region, a tube with a stable extended region of each type is required. Assigning one-hundredth of a volt for each information signal unit, 500 such levels total 5 volts. The value of one-hundredth of a volt is approximately the smallest voltage increment that can be maintained safely and repeatably in direct-current amplifier circuitry of this general type with generally available techniques.

The mixer circuit of Figure 6 operates as a function generator, generating a non-linear function of two variables. The principles of this circuit may be extended to the generation of functions of three or more variables. Thus, to generate functions of three variables a third tube (such as the tube 240 in Figure 10) may be connected in a circuit in the same manner as the other tubes 132 and 136. In general, the output voltage at the common cathode connection may be expressed by an equation of the form of Equation 7 above; namely, the output voltage equals the sum of the modified input voltages, the modification being the factor of the transconductance of the tubes associated with that input voltage divided by the sum of the transconductances of all the tubes.

Figure 10:
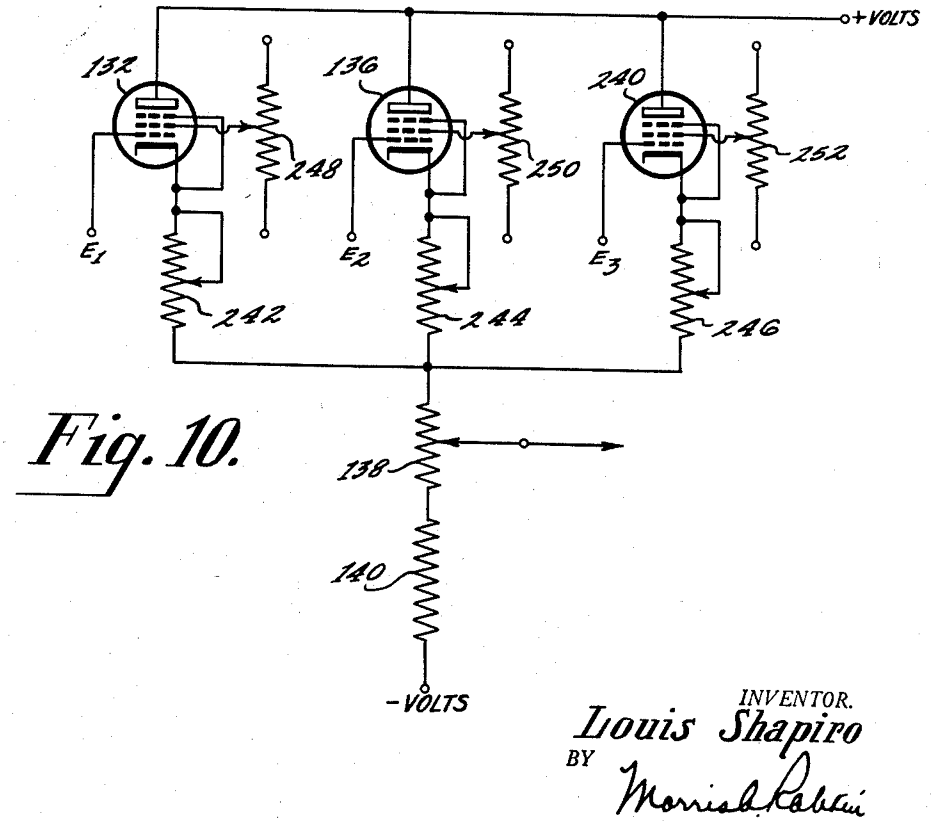
Figure 10 is a schematic circuit diagram of a modification of the circuit of Figure 5.

The circuit of Figure 10 is a modification of the circuit of Figure 6 in that trimming resistors 242, 244, and 246 are respectively connected between the cathodes of the tubes 132, 136, and 240 and the common terminal at the resistor 138. An additional modification in the circuit of Figure 10 is the provision of separate screen voltage supplies, shown as the respective potentiometers 248, 250, and 252, for the tubes 132, 136, and 240.

The relationship of the output voltage for this circuit of Figure 10 may be readily derived in a manner similar to Equation 7 above. This relationship for the circuit of Figure 10 is somewhat more complex in form due to the effects of the trimming resistors 242, 244, and 246. The effect of each trimming resistor in a two tube circuit may be described as tending generally to increase the relative contribution due to the input of the other tube rather than to decrease the importance of the input associated with that resistor; for example, the resistor 242 associated with the tube 132 tends to increase the relative contribution to the output $E_0$ of the $E_2$ input by a factor containing the product of the transconductance of the tube 132 and the resistance of the resistor 242.

These resistors 242, 244, and 246 may be unequal in magnitude, thereby producing a non-symmetrical mode of operation. Such a non-symmetrical mode of operation may also be produced by applying different screen voltages to the screens of the tubes in the circuits of Figure 6 or Figure 10. Screen voltage variations have the effect of varying somewhat the curvature of the tube characteristic. Another parameter that may be adjusted individually for the tubes in the circuits of Figure 6 or Figure 10 is that of the ranges of the input voltages. Variations in the range of input voltage have the effect of changing the portion of the tube characteristic, such as that shown in Figure 7, along which the tube operates. In connection with the circuit of Figure 6, such variations in input voltage range may be supplied on an individual basis by the amplifier circuits 100 and 124 of Figure 2. These amplifiers 100 and 124 may provide individual adjustments in terms of the gain as well as the direct voltage levels that are inserted.

If an output of opposite phase is desired, a common anode load resistor may be provided, and this output may be derived at the common anode connection. Generally, such an anode resistor should be sufficiently small so that the anode voltage excursion over the signal range is relatively small.

Thus, in accordance with this invention, a new and improved black printer system is provided. This system may be readily adapted to meet varied preferences and requirements in the amount of black to be printed for color reproductions. Also in accordance with this invention, a new and improved non-linear mixing circuit is provided; this mixing circuit may be used for generating non-linear functions of two or more variables.

What is claimed is:

1. Apparatus for deriving black printer information from a subject having color characteristics by means of signals representative of color components of said subject, said apparatus comprising means for producing first and second signals respectively representative of the brightness and of the color saturation of said subject from said color component signals, and means including a non-linear mixer circuit connected to receive the outputs of said first and second signal producing means and arranged to produce signals representative of the black of said subject from said brightness and color-saturation signals with the magnitude of said black signals being controlled primarily in accordance with the one of said brightness and color-saturation signals closer to one of the extremes over at least certain portions of the ranges of said first and second signals.

2. Apparatus for deriving black printer information from a subject having color characteristics by means of signals representative of color components of said subject, said apparatus comprising means for producing first and second signals respectively representative of the brightness and of the color-saturation of said subject from said color component signals, and means including a non-linear mixing circuit connected to receive and combine said first and second signals to produce signals representative of the black of said subject from said brightness and color-saturation signals with the magnitude of said black signals being controlled in the main in accordance with the magnitudes of those of said brightness signals representative of low brightness values and in accordance with the magnitudes of those of said color-saturation signals representative of near-maximum color-saturation values.

3. Apparatus for deriving black printer information from a subject having color characteristics by means of signals representative of color components of said subject, said apparatus comprising means for producing first and second signals respectively representative of the brightness and of the color-saturation of said subject from said color component signals, and means for producing signals representative of the black of said subject by combining said brightness and color-saturation signals with the magnitudes of those of said black signals representative of high black values being primarily in accordance with the magnitudes of those of said brightness signals representative of low brightness values, with the magnitudes of those of said black signals representative of low black values being primarily in accordance with the magnitudes of those of said color-saturation signals representative of near-maximum color-saturation values, and with the magnitudes of those of said black signals representative of intermediate black values being primarily in accordance with the magnitudes of both said brightness and color-saturation signals.

4. Apparatus for deriving black printer information from a subject having color characteristics by means of signals representative of color components of said subject, said apparatus comprising means for producing first and second signals respectively representative of the brightness and of the color saturation of said subject from said color component signals, and mixer means responsive to said first and second signals for producing signals representative of the black of said subject from said brightness and color-saturation signals, said black signal producing means including means for controlling the rate of change of said black signals in accordance with the rate of change of said color-saturation signals.

5. Apparatus for producing achromatic representative information from a subject in color by means of component-color representative signals derived from said subject, said apparatus comprising a circuit for producing a brightness representative signal from said component-color signals, a circuit for producing a color-saturation representative signal from said component-color signals, and a circuit including a non-linear mixer device for producing an achromatic representative signal by combining said brightness signal and said color-saturation signal over a continuously extended range of each.

6. Apparatus for producing achromatic representative information from a subject in color by means of component-color representative signals derived from said subject, said apparatus comprising a circuit for producing a brightness representative signal from said component-color signals, a circuit for producing a color-saturation representative signal from said component-color signals, and a circuit for producing an achromatic representative signal from said brightness signal and said color-saturation signal with the magnitude of said achromatic signal being controlled primarily in accordance with the one of said brightness and color-saturation signals closer to one of the extremes of the ranges of said brightness and said color-saturation signals over at least certain portions of said ranges.

7. Apparatus as recited in claim 6 wherein said circuit for producing an achromatic signal is operative to control the magnitude of said achromatic signal directly as the one of said brightness and color-saturation signals closer to said one extreme.

8. Apparatus as recited in claim 6 wherein said circuit for producing an achromatic signal is operative to control the magnitude of said achromatic signal substantially as the one of said brightness and color-saturation signals closer to said one extreme when relatively widely separated in value and substantially as the average thereof when relatively close together in value.

9. Apparatus for producing achromatic representative information from a subject in color by means of component-color representative signals derived from said subject, said apparatus comprising a circuit for producing a brightness representative signal from said component-color signals, a circuit for producing a color-saturation representative signal from said component-color signals, and a biased non-linear mixer circuit for producing an achromatic representative signal from said brightness signal and said color-saturation signal with the magnitude of said achromatic signal varying as the sum of certain fractions of said brightness and color-saturation signals depending upon the bias setting of said mixer.

10. In a system for obtaining color corrected records from a subject having color characteristics wherein apparatus produces a plurality of corrected color-component signals in accordance with a plurality of uncorrected color-component signals derived from said subject and in accordance with signals representative of the black of said subject, the combination with said apparatus of means for producing signals related to the brightness of said subject in accordance with a plurality of said color-component signals, means for producing signals related to the color saturation of said subject in accordance with a pluraliy of said color-component signals, means for producing signals representative of the black of said subject in accordance with both said brightness and color saturation signals with the one thereof having a value closer to a certain extreme tending to dominate in the production of said black signals, and means for applying said black signals to said corrected signal producing apparatus.

11. In a system for obtaining color corrected records from a subject having color characteristics wherein apparatus produces a plurality of corrected color-component signals in accordance with a plurality of uncorrected color-component signals derived from said subject and in accordance with signals representative of the black of said subject, the combination with said apparatus of means for producing signals related to the brightness of said subject in accordance with a plurality of said uncorrected color-component signals, means for producing signals related to the color saturation of said subject in accordance with a plurality of said corrected color-component signals, means for producing signals representative of the black of said subject in accordance with said brightness and color-saturation signals with the magnitude of said black signals being controlled primarily in accordance with the magnitude of those of said brightness signals representative of low brightness values and in accordance with the magnitude of those of said color-saturation signals representative of near-maximum color-saturaiton values, and means for applying said black signals to said corrected signal producing apparatus.

12. In a system for obtaining color corrected records from a subject having color characteristics wherein apparatus produces a plurality of corrected color-component signals in accordance with a plurality of uncorrected color-component signals derived from said subject and in accordance with signals representative of the black of said subject, the combination with said apparatus of means for producing first signals representing the weighted brightness of said subject in accordance with a plurality of said color-component signals, means for producing second signals representing the color saturation of said subject in accordance with a plurality of said color-component signals, mixer means for producing signals representative of the black of said subject in accordance with both said first and second signals with the one thereof having a value closer to a certain extreme tending to dominate in the production of said black signals, and means for applying said black signals to said corrected signal producing means.

13. The combination as recited in claim 12 wherein one and the other of said first and second signal producing means respectively receive said plurality of uncorrected color-component signals and said plurality of corrected color-component signals and are operable in accordance therewith.

14. In a system for obtaining color corrected records from a subject having color characteristics wherein apparatus produces a set of corrected signals corresponding to different color components in accordance with a set of uncorrected signals corresponding to different color components, said uncorrected signals being derived in accordance with the color characteristics of said subject, the combination with said apparatus of means for producing first signals in accordance with all of one of said sets of signals, means for producing second signals in accordance with all of the other one of said sets of signals, and means including a pair of remote cutoff tubes each responsive to a different one of said first and second signals for producing signals representative of the black of said subject in accordance with the one of said first and second signals closer to one of the extremes.

15. In a system for obtaining color corrected records from a subject having color characteristics wherein apparatus produces a set of corrected signals corresponding to different color components in accordance with a set of uncorrected signals corresponding to different color components, said uncorrected signals being derived in accordance with the color characteristics of said subject, the combination with said apparatus of means for producing first signals having magnitudes in accordance with all of one of said sets of signals, means for producing second signals having magnitudes in accordance with all of the other one of said sets of signals, and non-linear mixer means responsive to said first and second signals for producing signals representative of the black of said subject by combining said first and second signals over a continuously extended range of magnitude of each.

16. In a system for obtaining color corrected records from a subject having color characteristics wherein apparatus produces a set of corrected signals corresponding to different color components in accordance with a set of uncorrected signals corresponding to different color components, said uncorrected signals being derived in accordance with the color characteristics of said subject, the combination with said apparatus of means for producing first signals in accordance with all of one of said sets of signals, means for producing second signals in accordance with portions of said component-color signals of the other one of said sets that go beyond a certain value, means including a non-linear mixer circuit for producing signals representative of the black of said subject in accordance with both said first signals and said second signals with the magnitude of said black signals being controlled primarily in accordance with the one of said first and second signals closer to one of the extremes over at least certain portions of the ranges of said first and second signals.

17. The combination as recited in claim 16 wherein said black signal producing means is operative to control the magnitude of said black signals directly as the one of said first and second signals closer to said extreme over the entire ranges thereof.

18. The combination as recited in claim 16 wherein said black signal producing means is operative to control the magnitude of said black signals substantially as the one of said first and second signals closer to said extreme when said first and second signals are relatively widely separated in value and substantially as the average thereof when said first and second signals are relatively close together in value.

19. In a system for obtaining color corrected records from a subject having color characteristics, a non-linear mixer circuit comprising a plurality of electron control devices of the remote cutoff type, each of said devices having anode, cathode and control electrodes, means for applying to said control electrodes signals representing different characteristics of said subject to be mixed, a common cathode impedance connected to said cathode electrodes, and means for deriving output signals substantially in accordance with the current in said common impedance.

20. In a system for obtaining color corrected records from a subject having color characteristics, a non-linear mixer circuit comprising a plurality of electron control devices, each having anode, cathode, and control electrodes, each of said control devices having a transfer characteristic that includes two substantially linear regions of different slopes and substantial extent, means for applying to said control electrodes signals representing different characteristics of said subject to be mixed, a common cathode impedance connected to said cathode electrodes, and means for deriving output signals substantially in accordance with the current in said common impedance.

21. A non-linear mixer circuit as recited in claim 20 and further comprising separate impedances connected between said cathode electrodes and said common cathode impedances.

22. In a color correction system, a non-linear mixer circuit comprising a plurality of at least three electron control devices, each having anode, cathode, and control electrodes, each of said control devices having a transfer characteristic that includes two substantially linear regions of different slopes and substantial extent, means for applying to said control electrodes signals representing different color characteristics to be mixed, a common cathode impedance connected to said cathode electrodes, and means for deriving output signals substantially in accordance with the current in said common impedance.

23. In combination with a subject having color characteristics and means for deriving signals representing different characteristics of said subject, a non-linear mixer circuit comprising a plurality of electron control tubes of the remote cutoff type, each of said devices having anode, cathode and control electrodes, means for applying said signals as input signals to said control electrodes, a common cathode impedance connected to said cathode electrodes, and means for deriving output signals substantially in accordance with the current in said common impedance, the transfer characteristics of said tubes being such that said output signals are substantially proportional to the sum of said input signals each modified by a factor equal to the transconductance of the associated tube divided by the sum of the transconductances of said tubes.

References Cited in the file of this patent

UNITED STATES PATENTS

| | | |
|---|---|---|
| 2,434,561 | Hardy | Jan. 13, 1948 |
| 2,560,567 | Gunderson | July 17, 1951 |
| 2,691,696 | Yule | Oct. 12, 1954 |
| 2,721,892 | Yule | Oct. 25, 1955 |
| 2,740,828 | Haynes | Apr. 3, 1956 |
| 2,748,190 | Yule | May 29, 1956 |
| 2,757,571 | Loughren | Aug. 7, 1956 |
| 2,790,844 | Neugebauer | Apr. 30, 1957 |
| 2,799,722 | Neugebauer | July 16, 1957 |